United States Patent
Hvid Nielsen

(10) Patent No.: US 9,500,090 B2
(45) Date of Patent: Nov. 22, 2016

(54) METHOD FOR CRANELESS WIND TURBINE BLADE HANDLING VIA A TURBINE HUB

(75) Inventor: Kennet Hvid Nielsen, Randers (DK)

(73) Assignee: Vestas Wind Systems A/S, Aarhus N. (DK)

( * ) Notice: Subject to any disclaimer, the term of this patent is extended or adjusted under 35 U.S.C. 154(b) by 755 days.

(21) Appl. No.: 13/988,228

(22) PCT Filed: Nov. 15, 2011

(86) PCT No.: PCT/DK2011/050437
§ 371 (c)(1),
(2), (4) Date: Sep. 26, 2013

(87) PCT Pub. No.: WO2012/065613
PCT Pub. Date: May 24, 2012

(65) Prior Publication Data
US 2014/0010658 A1  Jan. 9, 2014

Related U.S. Application Data

(60) Provisional application No. 61/415,378, filed on Nov. 19, 2010.

(30) Foreign Application Priority Data

Nov. 18, 2010  (DK) .................................. 2010 70497

(51) Int. Cl.
*F01D 5/30* (2006.01)
*B66C 1/10* (2006.01)
*F03D 1/00* (2006.01)

(52) U.S. Cl.
CPC ................. *F01D 5/30* (2013.01); *B66C 1/108* (2013.01); *F03D 1/001* (2013.01); *F03D 1/003* (2013.01);

(Continued)

(58) Field of Classification Search
CPC ....... F03D 1/001; F03D 1/003; B66C 1/108; F01D 5/30; F05B 2240/916; Y02E 10/726; Y02E 10/728; Y10T 29/49318
See application file for complete search history.

(56) References Cited

U.S. PATENT DOCUMENTS 7,207,777 B2 *  4/2007  Bervang ................. B66C 1/108
                                                     416/119
7,726,941 B2 *  6/2010  Bervang ............... F03D 1/0658
                                                     416/1

(Continued)

FOREIGN PATENT DOCUMENTS

DE    202004016460 U1   12/2004
EP         2159419 A1    3/2010

(Continued)

OTHER PUBLICATIONS

International Searching Authority, Search Report and Written Opinion issued in corresponding International No. PCT/DK2011/050437 dated Apr. 3, 2012, 14 pages.

(Continued)

*Primary Examiner* — Igor Kershteyn
(74) *Attorney, Agent, or Firm* — Wood Herron & Evans LLP

(57) ABSTRACT

The invention involves craneless dismounting and/or mounting a vertically arranged wind turbine blade from a wind turbine generator hub mounted to a nacelle placed on a tower, the hub being arranged for having a number of blades attached. The method comprises mounting a number of bolt-like extensions in positions, where fastening bolts have been removed or could be received. These extensions are much longer than the fastening bolts, so that the blade may be handled using the extensions to a position where a lifting yoke may be attached or detached, either for lowering or lifting the blade. The method may be performed without a separate crane and is particularly useful in relation to blade maintenance, repair or replacement at remote wind turbine sites which would incur high costs for a mobile crane. Moreover, the method may be performed without having personnel going outside the hub or nacelle, but can stay at the ground and within the hub.

16 Claims, 11 Drawing Sheets

(52) U.S. Cl.
CPC ........ *F05B 2240/916* (2013.01); *Y02E 10/726* (2013.01); *Y02E 10/728* (2013.01); *Y10T 29/49318* (2015.01)

(56) References Cited

U.S. PATENT DOCUMENTS

| | | | |
|---|---|---|---|
| 7,874,805 B2* | 1/2011 | Pedersen | B66C 3/00 416/204 R |
| 9,120,652 B2* | 9/2015 | Munk-Hansen | B66C 23/18 |
| 2010/0028152 A1 | 2/2010 | Numajiri et al. | |
| 2010/0254813 A1 | 10/2010 | Dawson et al. | |

FOREIGN PATENT DOCUMENTS

| | | |
|---|---|---|
| EP | 2369174 A1 | 9/2011 |
| JP | 2005002875 A | 1/2005 |
| WO | 2009/128708 A2 | 10/2009 |
| WO | 2011095167 A2 | 8/2011 |

OTHER PUBLICATIONS

Danish Patent Office, Combined Search and Examination Report issued in corresponding DK Application No. PA 201070497 dated Jul. 8, 2011, 4 pages.

* cited by examiner ized energy from the wind to e.g. electrical energy via an electrical generator. The invention further relates to a wind turbine having at least one turbine blade mounted or dismounted according to the method.

METHOD FOR CRANELESS WIND TURBINE BLADE HANDLING VIA A TURBINE HUB

TECHNICAL FIELD

The present invention relates to a method of craneless dismounting and mounting a wind turbine blade from and to a hub, which is a structure arranged for having a number of blades attached to it and transferring energy from rotation of the blades to a nacelle, arranged on the top of a tower structure, for converting harvested energy from the wind to e.g. electrical energy via an electrical generator. The invention further relates to a wind turbine having at least one turbine blade mounted or dismounted according to the method.

BACKGROUND

When wind turbines are erected it is normal and feasible to use a large mobile crane, although such use is costly and may involve problems in getting the crane to the erection site. Erection sites are often remote and difficult to access, but since a tower, and a nacelle, a hub and blades etc. must all be lifted up for installation a mobile crane with a lifting yoke is normally preferred for eased and quick installation. The benefit is even larger if many turbines are to be erected for a wind park.

In case a single turbine blade, or a limited number of blades, have to be dismounted and refitted, e.g. in a rare situation for repair or replacement, the cost of sending a mobile crane is relatively very high as the cost is at a similar scale whether one blade has to be taken up and down or a whole turbine is to erected. Hence, it is preferred to perform such limited operations without a crane, especially seen in the light of modern wind turbines have a tower height extending beyond 100 meters, which requires very large cranes.

A number of solutions have been proposed for craneless dismounting and mounting blades. One proposal is shown in U.S. patent application 2010/0139062, where two pulleys are mounted externally on the hub of the wind turbine. A blade is lifted in a harness by the use of wires extending up from the ground via the pulleys and down to the harness to lift the blade. Such a solution requires that personnel must leave the nacelle or hub in order to fasten the pulleys to the hub and to arrange the wire extending from the ground over the pulleys.

In EP 2159419 is it suggested to use a ground based winch and run a lifting wire from the winch to the nacelle and via a number of pulleys over a main shaft into a position outside or inside the hub. In both embodiments a hoisting jig is used which is connected to the blade via so-called T-nuts, which are metal inserts placed in through-going holes in the blade wall and arranged for receiving bolts for attaching the blade to a wind turbine hub. The hoisting jig for exterior mounting would for dismounting of blades require personnel to leave the hub for engaging the jig. The embodiment shown for internal mounting requires three eye plates for engaging the blade metal inserts in the through-going holes. This requires a tripod-like frame structure of a considerable size, which may be difficult to get into the hub without removing a blade first. Moreover, the required through-going holes having the metal inserts, which the hoisting jig is attached to, may seriously affect the strength of the blade as the maximum bending moment, both edgewise and flapwise—i.e. from wind pressure and gravity, is present at the blade root portion.

As turbine blades are normally preferred to be installed using a crane with a lifting yoke, the blades will mostly be without any specific structure adapted for receiving a crane hook or other similar rigging equipment. This is first of all because it is not expected that a blade has to be dismounted and because such a structure would a cost and weight to the blade.

There are a number of examples where blades have been fitted with holes, as in EP 2159419, for lifting or handling the blades. However, unless the holes are filled with an insert as in EP 2159419, other devices have to be used to close said holes to prevent water from penetrating or negatively influence the aerodynamics of the blades.

One object of the invention is to enable dismounting and mounting one or more blades from a hub attached to a nacelle placed on a tower, and performing this operation without the use of a separate crane, e.g. a mobile crane.

Another object of the invention is to avoid personnel having to leave the hub or nacelle to attach or detach e.g. lifting straps.

A further object of the invention is to avoid having to place various devices such as pulleys on the outside of the hub.

A yet further object is to avoid having to equip the blade with lifting means such as straps to be wrapped around the blade, or to equip the blade with e.g. holes for engaging lifting means to the blade, or to avoid providing the blade with an internal engagement structure to which lifting means may be engaged.

Other aspects, objectives and advantages of the invention will become more apparent from the following detailed description when taken in conjunction with the accompanying drawings.

SUMMARY OF THE INVENTION

The above objectives are met by the method according to one aspect of the invention, which involves dismounting of a wind turbine blade from a wind turbine generator hub mounted to a nacelle placed on a tower, said hub being arranged for having a number of blades attached, where the blade to be dismounted comprises a plurality of fastening bolts extending from the blade or the blade bearing into the hub, said fastening bolts being arranged to engage and to fasten the blade to the hub, the method comprising:

placing the blade to be dismounted in a substantially vertical position such that a tip of the blade is facing downwards, removing a number of fastening bolts, mounting a number of bolt-like extensions in positions, where fastening bolts have been removed, said extensions being longer than the fastening bolts, releasing the blade, moving the blade to an intermediate blade position using said bolt-like extensions, attaching a lifting yoke to a number of fastening bolts in the intermediate blade position, lowering the blade to a desired position using said lifting yoke.

By arranging the blade in a substantially vertical position with its tip facing downwards, i.e. facing the ground or in case of an offshore turbine facing the sea, the blade the lowering distance is minimised. As the bolt-like extensions are longer than the fastening bolts, which are used to fasten the blade, the blade may be unfastened, but still be held by the extensions, the blade may be lowered to an intermediate position, where suitable space is available for attaching a lifting yoke to a number of fastening bolts. The lifting yoke may then be used for lowering the blade to any desired lower position for maintenance or repair or any other operation. The force required for the lowering may be applied by a wire, chain or other known means.

The aforementioned objects are also met by another aspect of the invention, which may be seen as involving a reverse number of actions for mounting the blade instead of dismounting it. In greater detail the invention may involve a method of mounting a wind turbine blade to a wind turbine generator hub mounted to a nacelle placed on a tower, said hub being adapted for having a number of blades attached, the method comprising:

- arranging the blade hub to receive a blade to be mounted, said blade having a blade tip facing downwards and being in a substantially vertical position,
- attaching a plurality of fastening bolts extending from a root end of the blade or from a blade bearing at the blade root end, said fastening bolts being arranged for the blade fastened to the hub,
- mounting a number of bolt-like extensions in positions adapted for receiving fastening bolts, said extensions being longer than the fastening bolts,
- attaching a lifting yoke to a number of fastening bolts,
- lifting the blade with the lifting yoke to an intermediate blade position at the blade hub, where the bolt-like extensions extend through mounting holes in the hub, said mounting holes being arranged for receiving the fastening bolts,
- holding the blade in the intermediate blade position using said bolt-like extensions,
- removing the lifting yoke,
- using the bolt-like extensions for moving the blade from the intermediate blade position to a position, where the blade is fastened to the hub.

Again, by arranging the blade in a substantially vertical position with its tip facing downwards, i.e. facing the ground or in case of an offshore turbine facing the sea, the blade the is easily lifted when the lifting means are attached at the blade root or blade bearing, since the centre of gravity will by below where the lifting means are attached. As the bolt-like extensions are longer than the fastening bolts, which are used to fasten the blade, the extensions can engage into the hub and used to hold the blade in an intermediate position to where the blade may be lifted, and where suitable space is available for de-attaching a lifting yoke. The lifting yoke may then be used for lifting the blade to a position for being fastened to the hub. Preferably, this is done by replacing the bolt-like extensions with further fastening bolts to fully fasten the blade.

It is realized from the above that the objects of the invention are met. By the invention dismounting and mounting one or more blades from a hub attached to a nacelle placed on a tower, and performing this operation may be done without the use of a separate crane, e.g. a mobile crane. Also, it is avoided for personnel having to leave the hub or nacelle to attach or detach e.g. lifting straps, or having to place various devices such as pulleys on the outside of the hub. Moreover, it is avoided having to equip the blade with lifting means such as straps to be wrapped around the blade, or to equip the blade with e.g. holes for engaging lifting means to the blade, or to avoid providing the blade with an internal engagement structure to which lifting means may be engaged.

In another aspect the blade may lifted to or lowered from the hub with a wire connected to the lifting yoke, said wire being introduced into the hub via at least one pulley. As it may be difficult, but not impossible depending on the size of the wind turbine or of the hub, to arrange e.g. a winch in the hub to lift or lower a blade, it is preferred to introduce a wire from a location outside the hub. In such a case a pulley is suited to shift a direction of the wire and to define a suitable position relative to the blade and lifting yoke, for such a wire entering the hub. More than one pulley may be required such that the wire do no collide with other equipment e.g. in the hub or in the nacelle.

In a further aspect a wire is introduced into the hub via a receiving portion, said receiving portion being located in a concave part of the hub. The concave part of the hub is the side of the hub facing the wind during operation of the turbine. It could also be called a front side of the hub, and then the back side of the hub is the side which faces the nacelle.

Dependent of the design of the nacelle, the hub and the main shaft connecting the hub and nacelle, it may be preferred to introduce the wire via a receiving portion located in said concave part or front side of the hub. In another aspect which may be used with some turbines which have a hollow main shaft through which the wire could be introduced also, i.e. from the back side of the hub. Or the nacelle may be designed with some spacing between the main shaft and the nacelle in order that personnel may enter the hub from the nacelle, so the wire may be introduced via said spacing. Even if such a spacing is available it may be preferred to introduce the wire from the concave part of the hub to avoid installation of a complex system of pulleys to carefully convey the wire to avoid collision with other turbine components.

In wind turbines having two, four, six and so on blades, there will due to reasons of symmetry, an upper blade, other than the one which is going to be mounted or dismounted downwardly, will be right above the one to be mounted or dismounted, whereby an anchoring frame is advantageously attached to e.g. the fastening bolts of said upper blade. This alleviates the need for having other means in the hub to attach to or create such means e.g. by drilling mounting holes. In wind turbines having three blade, the two blades, other than the one which is going to be mounted or dismounted, will be in symmetrical position, where a virtual line connecting fastening bolts or engagement portions for fastening bolts will be horizontal and very well suited for mounting opposite ends of an anchoring frame to supporting at least one pulley, guiding a wire to lift or lower a blade. Again, alleviating a need for providing other means to attach such an anchoring frame within the hub.

Furthermore, the wire may operated by a nacelle based or ground based winch. As explained above the nacelle may be used but required a system of pulleys to guide the wire to the hub, if at all possible. The wire may even enter the nacelle from a location at the ground or in the tower. However, it is preferred to use ground based wind located in position in order that a wire from the winch may be received via a receiving opening in the concave side of the hub, whereby the pulley arrangement may be simpler.

Another aspect involves that the lifting yoke may be an essentially longitudinal frame having receiving means arranged at each end and adapted for receiving fastening bolts for securing a blade to the yoke as well as at least one attachment portion arranged to be engaged by a lifting device. Such a lifting yoke may be designed with a very low weight an hence easily handled and mounted or dismounted to the blade.

In another aspect the blade may be moved to or from the intermediate position by actuators connected to the bolt-like extensions. Such actuator will ensure safe operation of the moving, which may be performed by remote control so the personnel may be at a safe distance from any hazardous positions. In one embodiment the actuators may hydraulically and hydraulic pressure be applied by a hydraulic unit comprising valves and a pump. The hydraulic unit may be a portable unit brought to or stored at the turbine for use in blade mounting or dismounting. Or hydraulic equipment already available in the turbine may be used, such as e.g. for blade pitch actuation.

In a further aspect the blade is moved to or from the intermediate position with a second lifting yoke adapted to engage the bolt-like extensions. By using a second lifting yoke this may be lifted or lowered with the same means for lifting and lowering the blade with the prior mentioned lifting yoke, i.e. the lifting yoke used for lifting and lowering the blade to or from the ground or sea.

In another aspect only one lifting yoke may be used for both lifting and lowering, but also for moving the blade to and from the intermediate position. In a one aspect for dismounting the blade at least two additional bolt-like extensions are mounted in positions adapted for receiving fastening bolts, wherein when the blade after being lowered to the intermediate position, the blade is secured using the two additional bolt-like extensions, and the lifting yoke, which is attached to the blade bolt-like extensions is detached and engaged with fastening bolts and the blade is lowered to a desired position using said same lifting yoke. In further aspect for mounting the blade at least two additional bolt-like extensions are mounted in positions adapted for receiving fastening bolts, wherein when the blade is in the intermediate position, the blade is secured using the two additional bolt-like extensions, and where the lifting yoke, which is attached to the fastening bolts is detached and engaged with bolt-like extensions for lifting the blade into a position, where the fastening bolts are fastened to the hub either directly or via a blade bearing.

As the hub mostly is a strong, cast or forged structure, having many functions and components attached to it, it may not in itself have an optimum aerodynamic shape. To compensate for this and to cover the hub, it is common to attach a so-called spinner, which is typically a lightweight fibre reinforced plastic structure. The spinner structure would be covering the hub to improve wind flow conditions around the hub, and where prior to introducing the wire into the hub a suitable section of the spinner is cut away in order to receive the wire. Some spinners may be equipped with a detachable section or a hatch, e.g. for emergency exit, but such an opening may not be ideal to be used as a receiving opening for receiving a lifting wire. Instead, a section can be cut away to obtain a receiving opening in a more suited position, which will enable a better entry position or angle of a lifting wire to be used in the hub for lifting or lowering a blade. For practical reasons the cut away section may be fixed again after the lowering and/or lifting operation has been completed, e.g. by gluing or other suitable means.

Most horizontal axis turbines have the main shaft slightly tilted upwards, e.g. 6-7 degrees to enlarge the distance between the blades and the tower. Hence, a blade oriented with the tip pointing downwards will not be completely vertical, but having the tip pointing slightly into what would be the leeward side in operation of the turbine. Hence, it is a preferred aspect that the blade orientation is partly controlled by at least one tag line attached to the blade in a vicinity of the blade tip. The tag line may be controlled from the ground or sea by personnel or a winch. The blade may hereby be moved to or from the intermediate position, which is a portion away from its fastened position, and have its tip orientation maintained during the movement, which could otherwise bend or damage the fastening bolts or the bolt-like extensions as gravity would try to pull the blade into an almost completely vertical orientation.

The tag line may be attached while the blade is at the ground or sea level. When the blade is mounted on the turbine a circular sling may be attached to the blade and kept in position by one or more lines attached to the sling and extending between the hub and the ground or sea and operated by personnel or a winch.

In order to get a lifting wire to the nacelle or hub, a line or a rope may be lowered from the hub or nacelle, attached to the lifting wire and pulled up to a suitable position in the nacelle or hub.

Many details unrelated to the invention are not shown in the figures for the sake of clarity, but are of course known to a skilled person within the field of wind turbine technology.

DETAILED DESCRIPTION OF THE INVENTION

Figure 1:
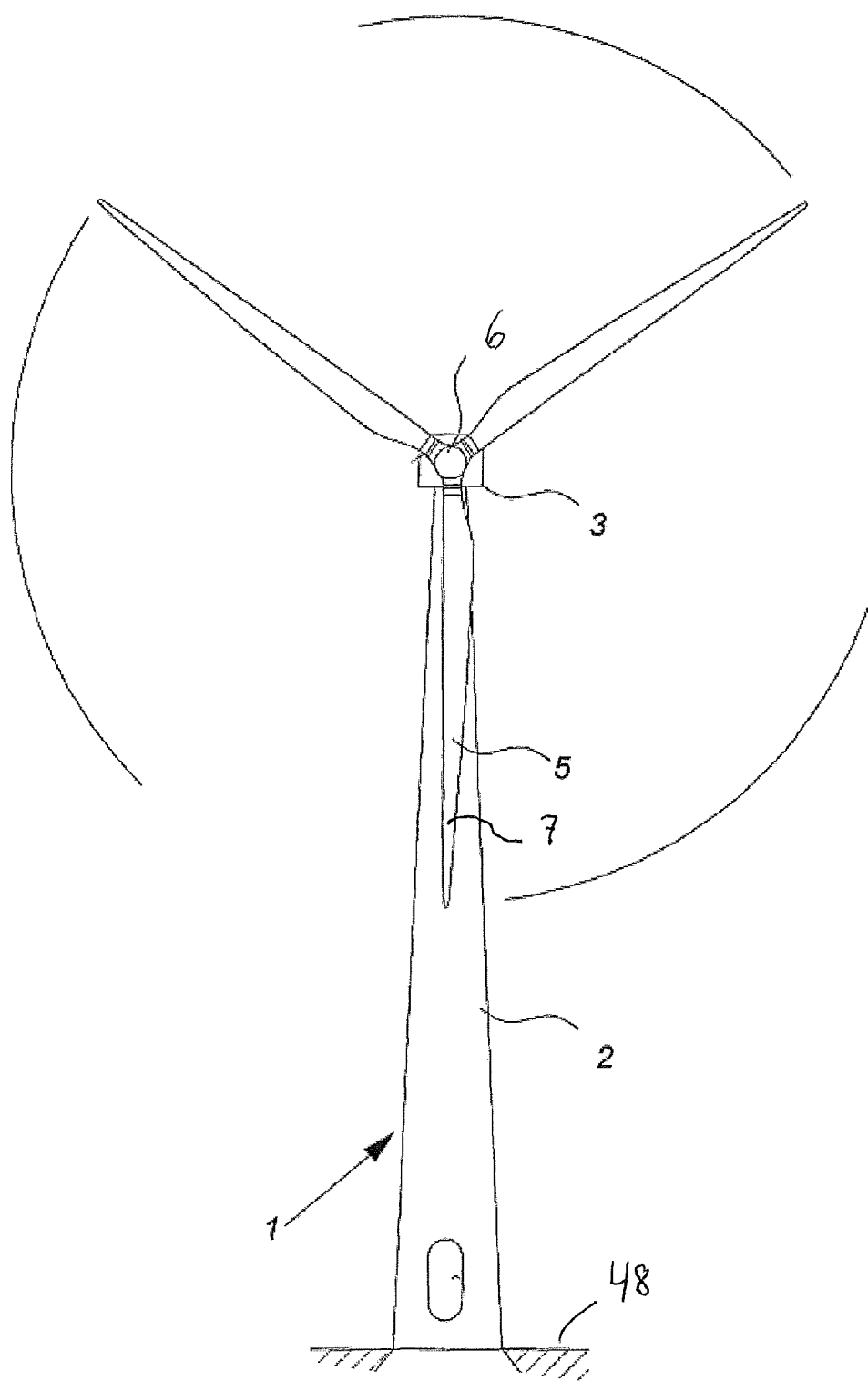
FIG. 1 shows a schematic front view of a known modern type wind turbine.

The wind turbine 1 of a well known modern type shown in FIG. 1 generally comprises a nacelle 3 mounted with a hub 6. Turbine blades 5 with blade tips 7 are mounted on the hub 6. The nacelle 3 is mounted on the top of a tower 2. The hub 6 is mounted to the nacelle 3 typically via main shaft 52 (shown in FIG. 2). Typically an electrical generator (not shown) is housed within the nacelle 3 and is driven by rotation of the hub 6 harvesting wind energy from the blades 5 to generate electrical power, but other types of power and/or energy or input/energy for physical or chemical processes, e.g. for the production of hydrogen, as well as heating or cooling may also be the objective. The wind turbine 2 is normally placed on the ground 48 at in offshore locations. The inventive aspects and concepts described in this document and appended drawings may be used for both on land as well as offshore use. As explained above the is a need for dismounting and mounting blades 5 from a hub 6 attached to a nacelle 3 placed on a tower 2, and performing this operation without the use of a separate crane, e.g. a mobile crane.

Blade root ends are provided with fastening bolts as in reference numeral 48 "T-bolt" in EP 2159419, or having an embedded metal insert in the blade wall, where the insert has a threaded hole for receiving a blade stud bolt or a bolt having a bolt head. The fastening bolts 4 for fastening the blade to a hub of a wind turbine as shown in FIG. 2.

Figure 2:
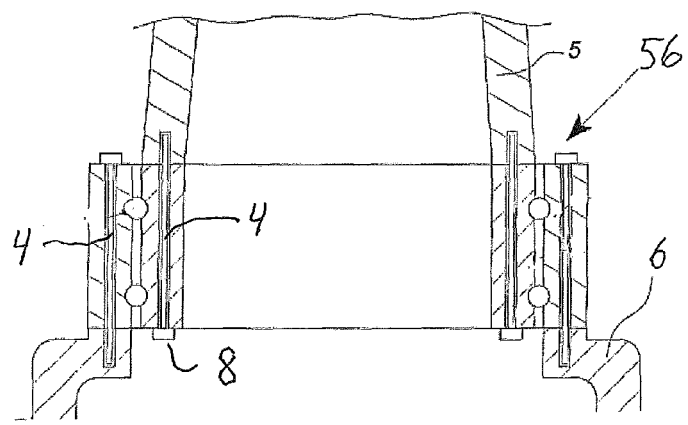
FIG. 2 shows a schematic, cross-sectional view of a blade connected to a turbine hub via a blade bearing.

FIG. 2 shows a blade 5 connected to a turbine hub 6 via a blade bearing 56. The bearing is used in order to be able to pitch the blade. The blade 5 is fastened to the bearing 56 with fastening bolts 4, here shown as stud bolts having a nut 8 to obtain a desired tensioning of the bolts, but the bolts 4 may also be of a type having bolt heads. Preferably for the present invention, stud bolts are preferred, at least for mounting as such bolts may be pre-installed prior to the mounting of the blade. In FIG. 2 the fastening bolts 8 for fastening the blade bearings 56 to the hub 6 are shown as bolts with a head, but also here stud bolts may be used.

Another issue to learn from FIG. 2, although not shown, is that the fastening bolts 4 for fastening the blade bearing may as well instead of coming from the bearing and into the hub 6, be placed the other way around, i.e. coming from the hub and entering the bearing 56. Also, e.g. stall-regulated turbine may not have blade bearings. Hence, both the fastening bolts 4 for fastening the blade to the hub 6 may be engaged directly with the hub, or engaged with a blade bearing 56, or attaching the blade bearing to the hub. The requirement is that the fastening bolts 4 may be attached and/or detached from the in inside of the hub, so the bolt-like extensions 10 (not shown in FIG. 2) may be used either for mounting or dismounting the blade. So in case of fastening bolts 4 attaching the blade bearing 56 and bolt-like extensions 10 may be used to perform the invention just as well as fastening bolt 4 attached to the blade root end.

Figure 3:
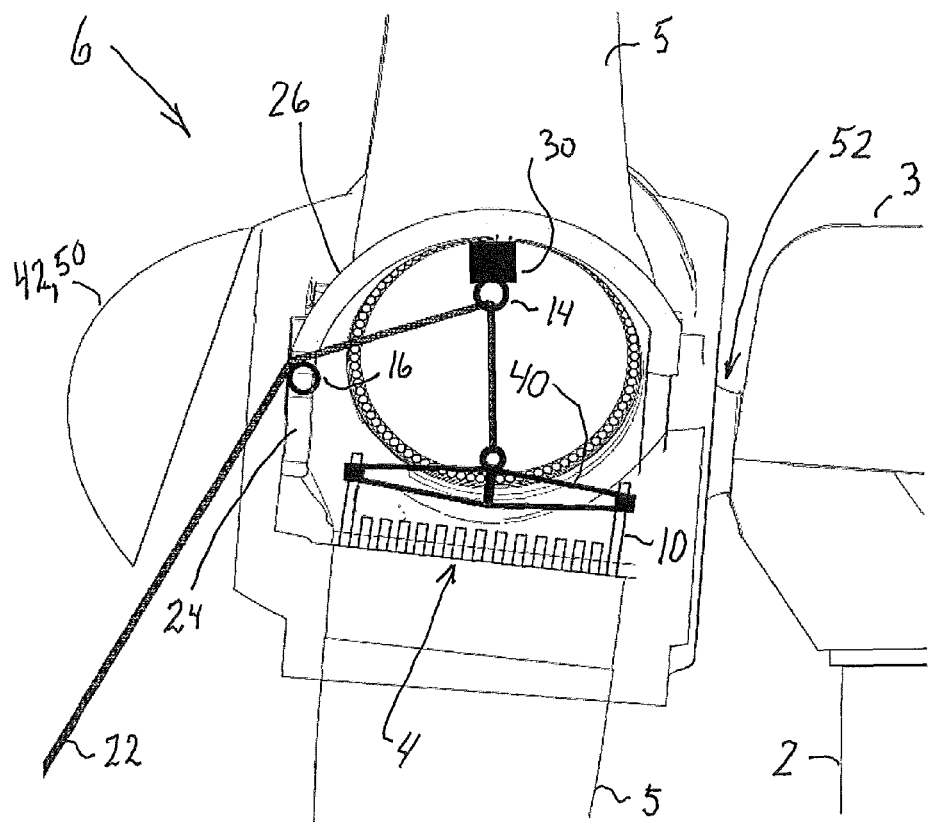
FIGS. 3-5 shows a schematic, cross-sectional side views of a part of a wind turbine, where a lifting wire, pulleys and a yoke is used to dismount a blade, or reversely to mount a blade.

By the invention it is realized that dismounting a wind turbine blade 5, from a wind turbine generator hub 6 mounted to a nacelle 3 placed on a tower 2, may be done with the use of bolt-like extensions 10 as shown in FIG. 3. The blade 5 is attached to the hub 6 by a large number of fastening bolts 4. The fastening bolts may be fastened to the hub 6 with nuts 8, which are arranged to engage and fixate the fastening bolts 4, or by using bolts with bolt heads.

Figure 4:
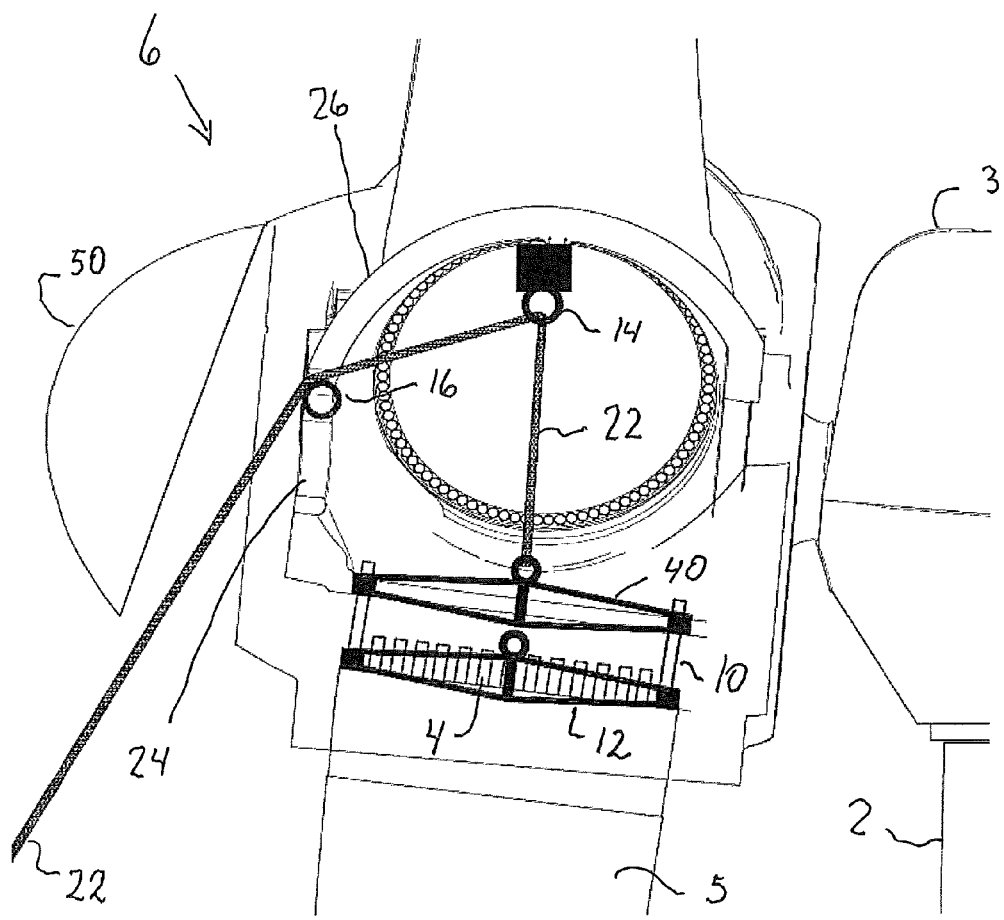
Figure 5:
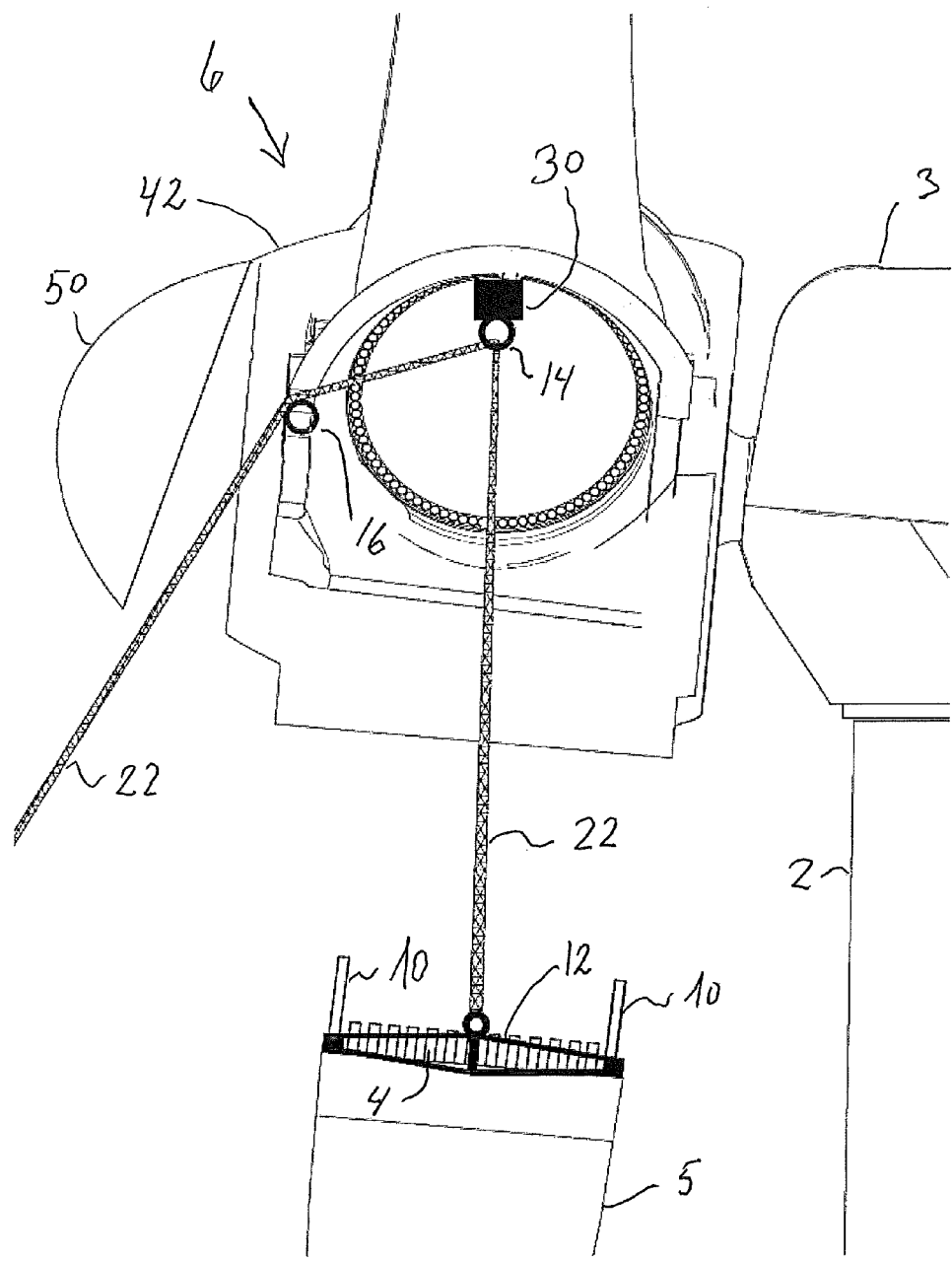

To start the dismounting of the blade 5 it is preferred to turn the hub 6 and thereby place the blade to be dismounted in a substantially vertical position such that a tip 7 of the blade is facing downwards. In FIG. 3 a number of fastening bolts 4 have been removed from the blade to allow the mounting a number of bolt-like extensions 10 in the positions, where fastening bolts have been removed. The bolt-like extensions are longer than the fastening bolts 4 as they are provided to be used in moving the blade to an intermediate blade position. At this stage and before the remaining nuts 8, or bolts with bolt heads, are removed from the remaining number of fastening bolts to release the blade, means for holding and moving the blade must be attached to the bolt-like extensions 10. As aforementioned actuators can be used, e.g. hydraulic actuators, but also pneumatic or electrical actuators can be used. Also, a lifting yoke 40 can be used as shown in FIG. 3. Or two or more wires, ropes, chains etc. can be attached and used. After removing the remaining nuts or fastening bolts, the blade is lowered to an intermediate position as shown in FIG. 4. In FIGS. 3-5 it is shown that for moving and holding the blade 5 a wire 22 is introduced into the hub 6 via a receiving portion 24 in a concave part 26 of the hub. In order to provide access a hatch 50 in a spinner 42 has been opened. The spinner 42 structure is covering the hub to improve wind flow conditions around the hub, and where prior to introducing the wire 22 into the hub a suitable section of the spinner is cut away in order to receive the wire. As shown in FIG. 3 cutting is not necessary if e.g. a hatch 50 is part of the spinner 42. The wire 22 is guided by pulleys 16 and 14 to be attached to the lifting yoke 40, which is attached to the extensions 10. Also in FIG. 3 it is shown how the hub 6 is connected to the nacelle 3 via a main shaft 52 and that the nacelle is on the tower 2. Also shown in FIG. 3 is that at least one anchoring frame 30 may be arranged for supporting at least one pulley 14 attached to fastening bolts (not shown) arranged for fastening at least one blade other than the blade 5 being mounted or dismounted.

The intermediate position, as shown in FIG. 4 is chosen preferably as close to the hub 6, but at a sufficient distance such that a lifting yoke 12 may brought into a position between the hub 6 and the blade 5, where the yoke 12 may be attached to a number of fastening bolts 4 in the intermediate blade position. Means for holding the blade must be attached to the bolt-like extensions 10 in order to release the wire 22 and the yoke 40 before lowering the blade 5 to a desired position using the lifting yoke 12 as shown in FIG. 5.

With reference to FIGS. 3-5 blade mounting is explained. As a start the turbine tower 2, the nacelle 3 and the hub 6 must be installed. Then the blade hub is arranged to receive a blade 5 to be mounted, where the blade is having a blade tip 7 facing downwards and being in a substantially vertical position. A plurality of stud-type fastening bolts may be arranged connected to the blade root and extending from root end of the blade. In case fastening bolts with bolt heads are used, they must be engaged at a later stage. A number of bolt-like extensions 10 are arranged in positions adapted for receiving fastening bolts 4, where the extensions are longer than such fastening bolts. The blade bolt-like extensions 10 may be e.g. two to five times longer than the fastening bolts 4. A lifting yoke 12 is attached with a number of fastening bolts 4 and the blade 5 is lifted with the lifting yoke to an intermediate blade position at the blade hub 6, see FIG. 4. Some or all of the extensions 10 may also be used to guide the fastening bolts 4, if present, in relation to the hub 6. The bolt-like extensions 10 are arranged to extend through mounting holes in the hub, which are otherwise arranged for receiving the fastening bolts. Now the blade is held in the intermediate blade position using the bolt-like extensions, so that the yoke 12 can be removed. The bolt-like extensions are then used to move the blade from the intermediate blade position to a position, where the nuts 8 or bolt fastening bolts with bolt heads, can be attached to fasten the blade to the hub. For the movement of the blade any appropriate moving means may be used by being connected to the extensions 10, e.g. hydraulic actuators, but also pneumatic or electrical actuators can be used. Also, a lifting yoke 40 can be used as shown in FIG. 3. Or two or more wires, ropes, chains etc. can be attached and used. Finally, the bolt-like extensions 10 are removed and replaced with further fastening bolts 4, which may be engaged and fixated by nuts 8.

Figure 6:
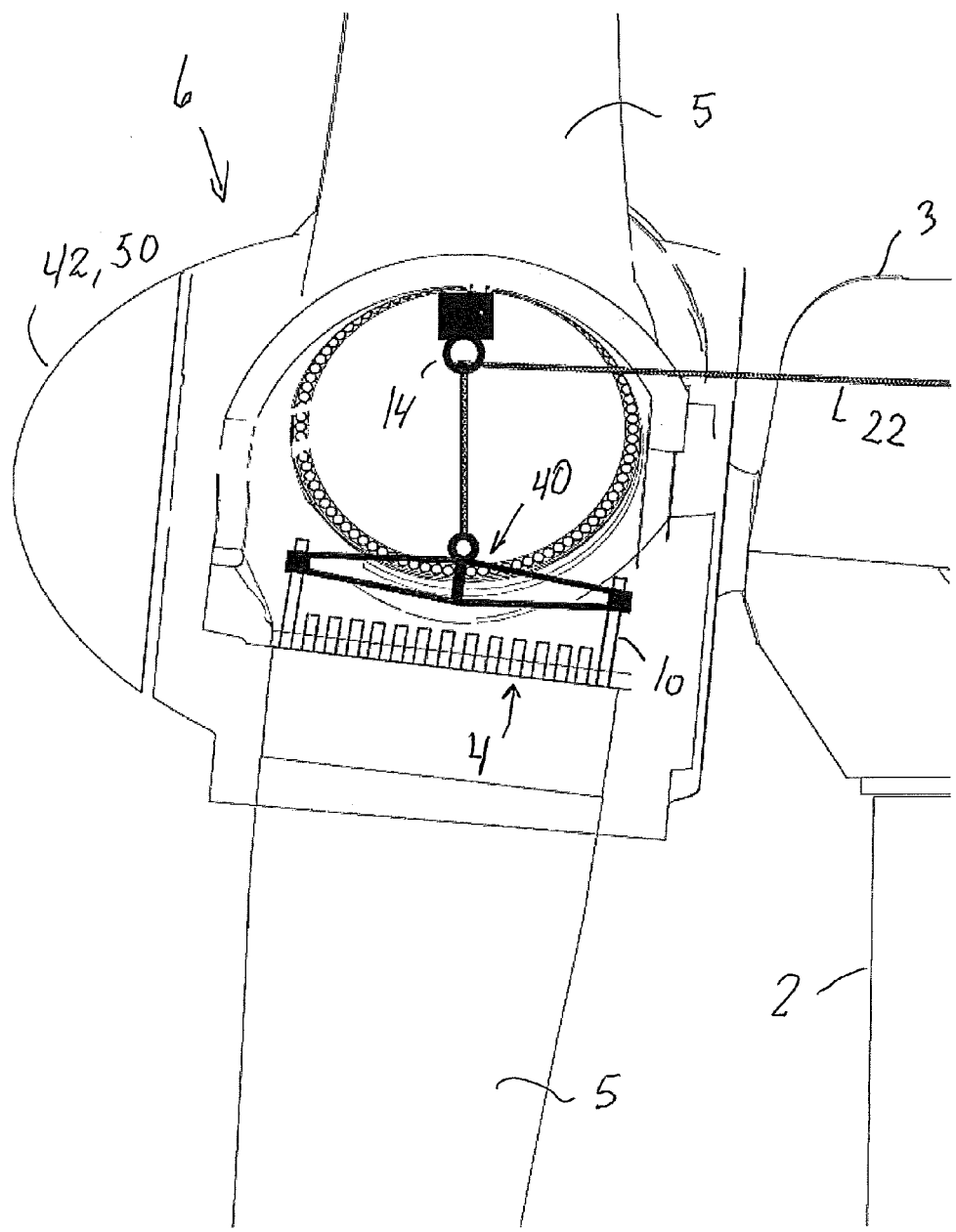
FIGS. 6 and 7 schematically show side views of alternative ways of leading a lifting wire into the hub.
Figure 7:
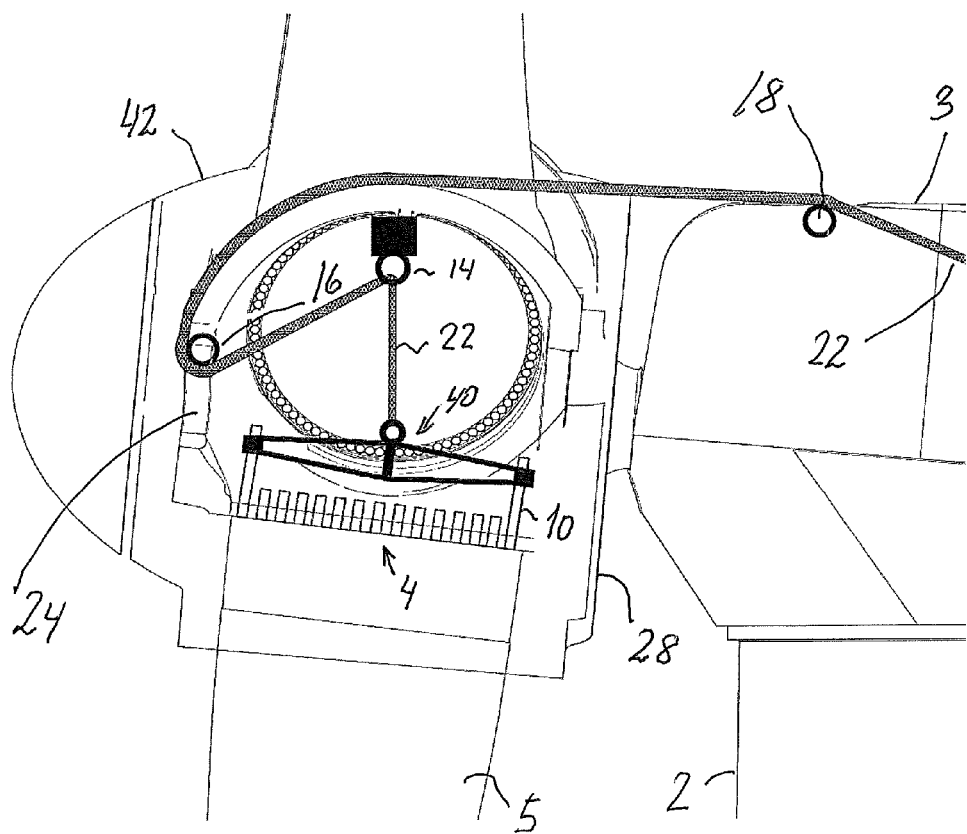

In FIGS. 6 and 7 it is shown how the lifting wire 22 may introduced into the hub 6 via the nacelle 3 to be e.g. connected to a lifting yoke 40. A number of pulleys 14, 16 and 18, or even further pulleys, are required dependent on the route of the wire.

Figure 9:
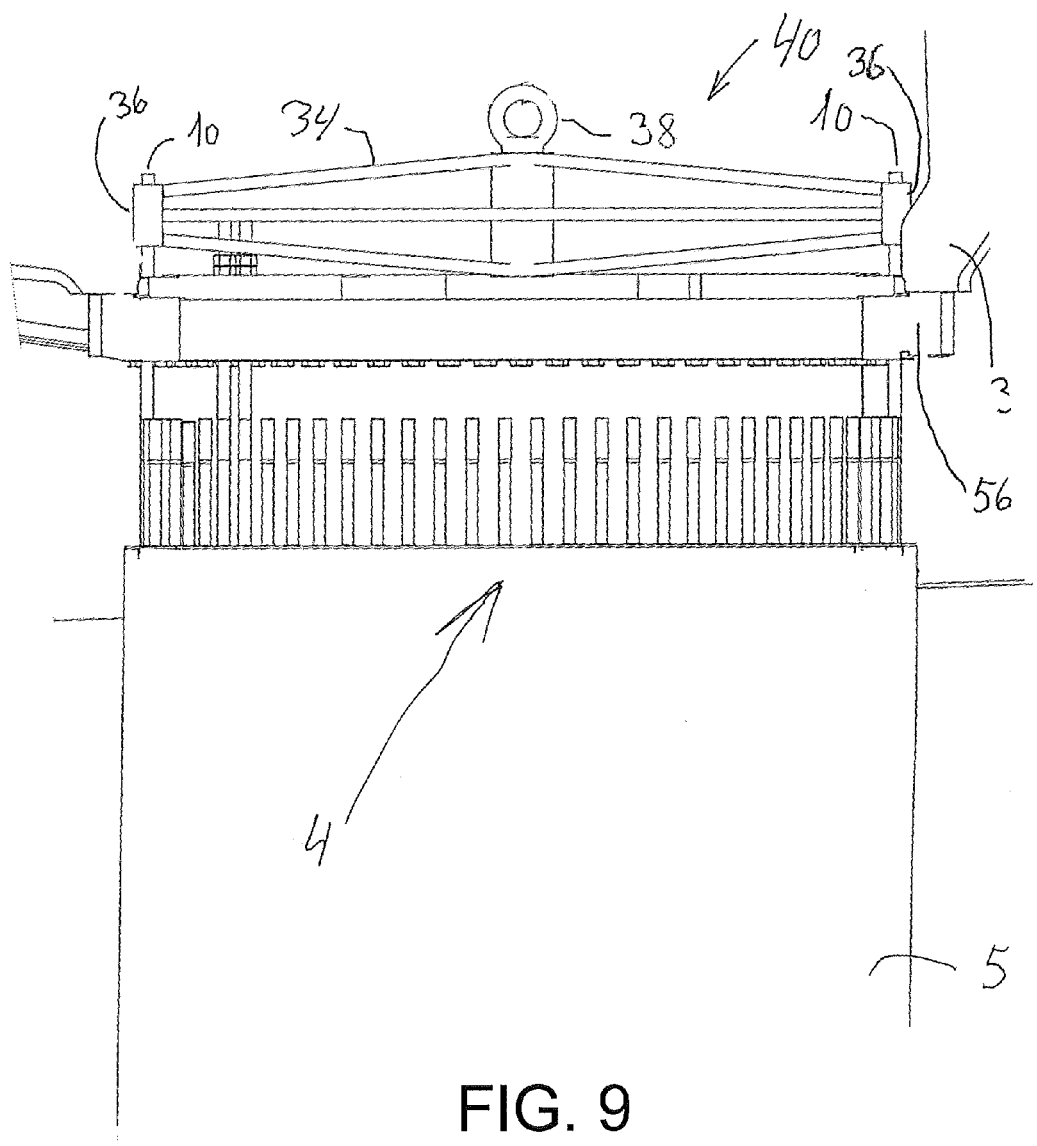

In FIG. 9 it is shown that a lifting yoke 40 may be designed comprising an essentially longitudinal frame 34 having receiving means 36 arranged at each end and adapted for receiving fastening bolts 8 for securing a blade 5 to the yoke as well as at least one attachment portion 38 arranged to be engaged by a lifting device such as a wire or a chain.

Figure 8:
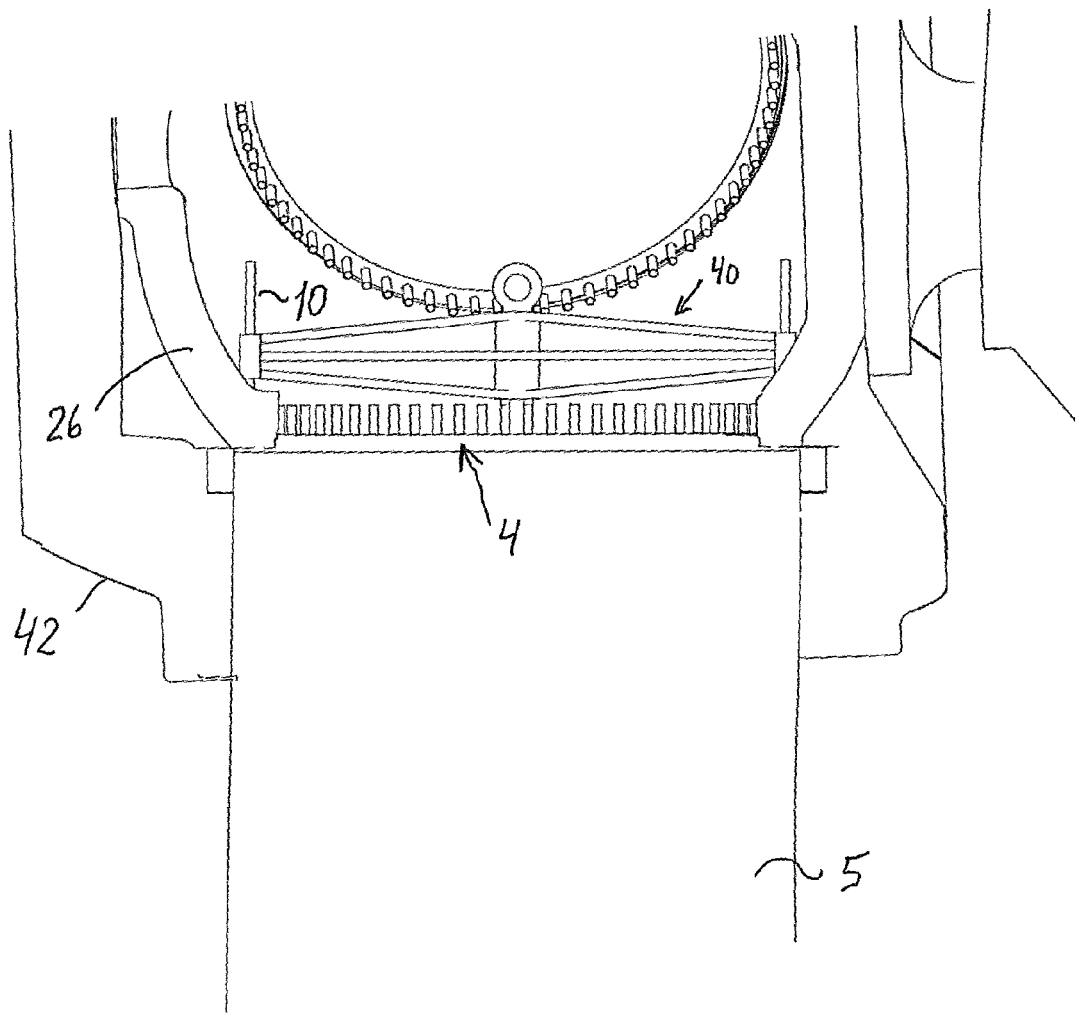
FIGS. 8-10 schematically show side views of details regard how only one yoke may be used for dismounting or mounting a blade.
Figure 10:
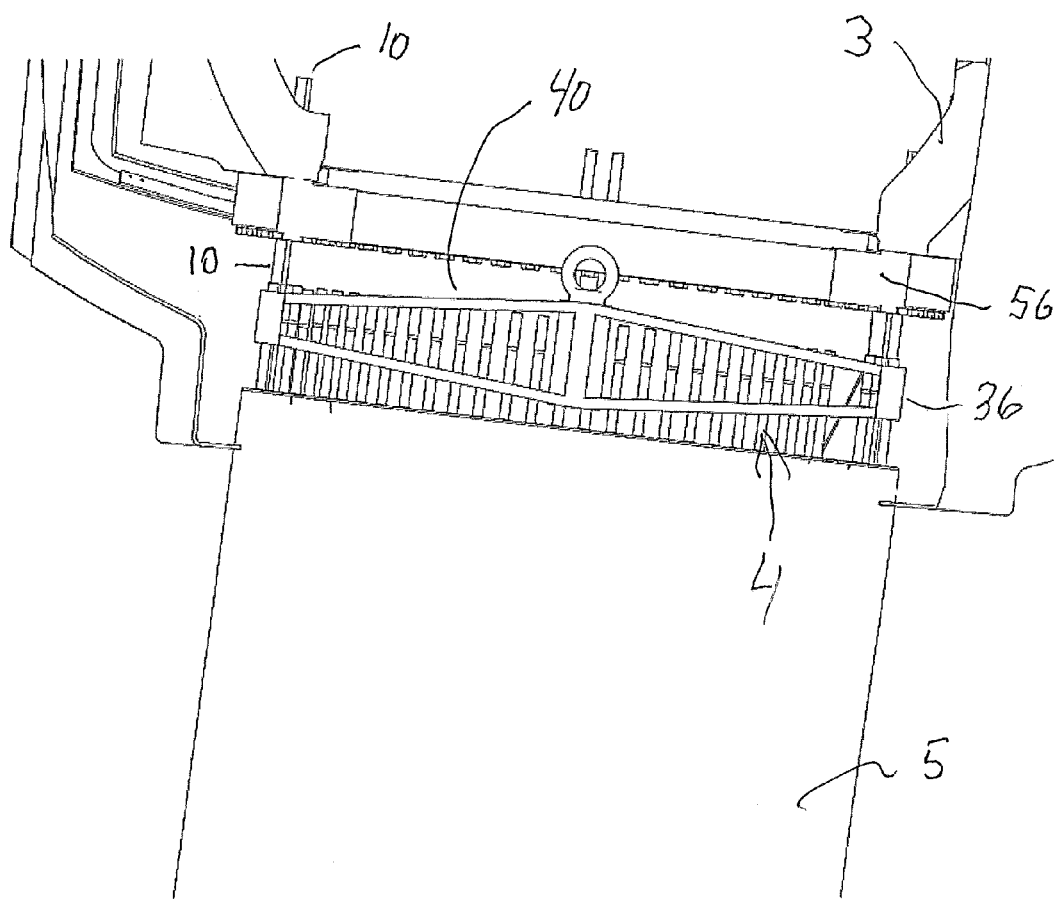

In FIGS. 8-10 it is shown how only one lifting yoke 40 may be used for both lifting and lowering, but also for moving the blade 5 to and from the intermediate position. In a one aspect for dismounting the blade at least two additional bolt-like extensions 10 are mounted in positions 36 adapted for receiving fastening bolts 4, see FIG. 8, wherein when the blade after being lowered to the intermediate position, see FIG. 9, the blade is secured using the two additional bolt-like extensions 10, and the lifting yoke 40, which is attached to the blade bolt-like extensions is detached and engaged with fastening bolts, see FIG. 10, and the blade is lowered to a desired position using said same lifting yoke. In further aspect for mounting the blade, FIGS. 8-10 are to be read reversely to the just explained dismounting. At least two additional bolt-like extensions are mounted in positions adapted for receiving fastening bolts, wherein when the blade is in the intermediate position, the blade is secured using the two additional bolt-like extensions, and where the lifting yoke, which is attached to the fastening bolts is detached and engaged with bolt-like extensions for lifting the blade into a position, where the fastening bolts are fastened to the hub.

Figure 11:
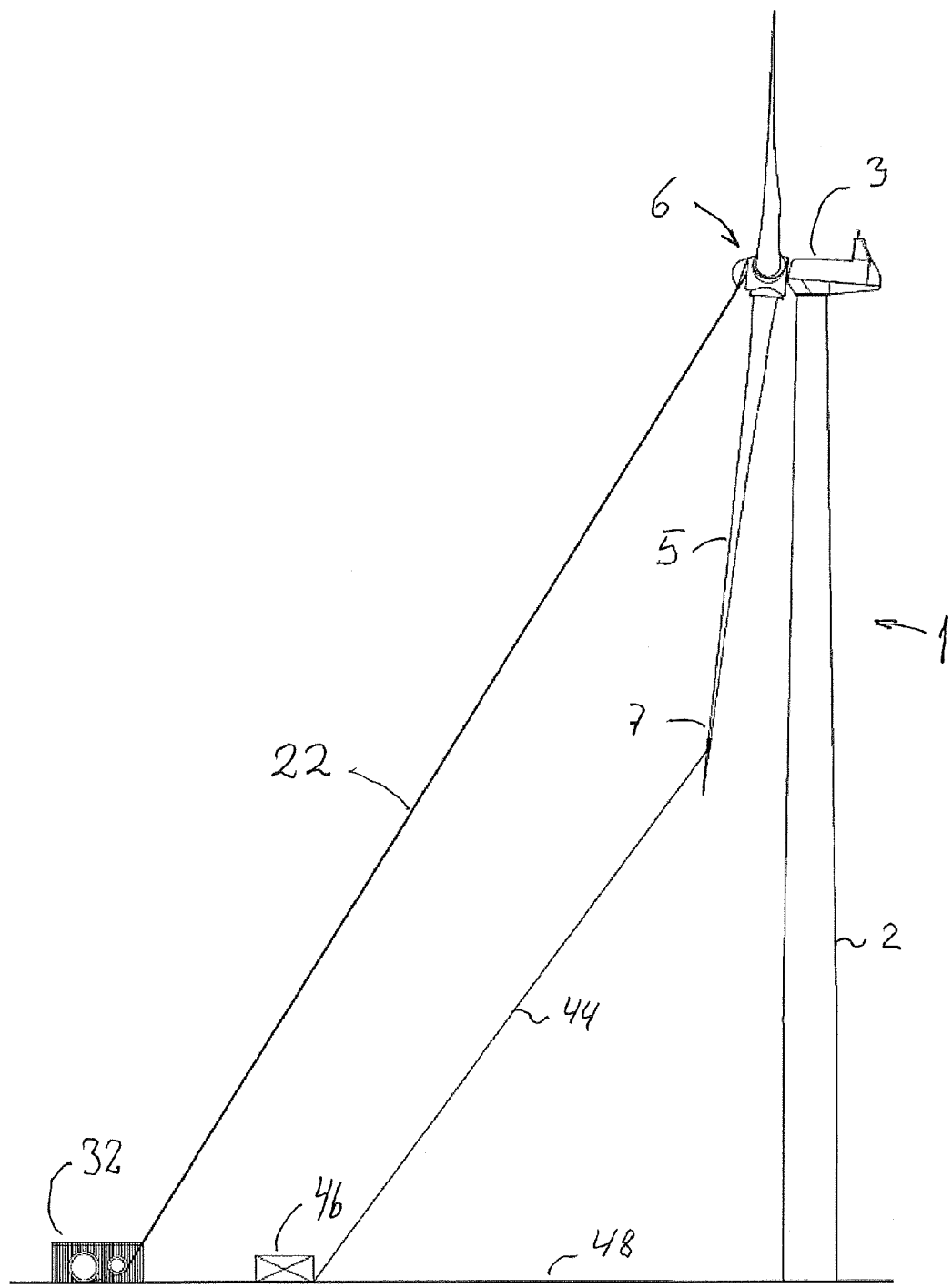
FIGS. 11 and 12 schematically show side views of the dismounting or mounting of a blade.
Figure 12:
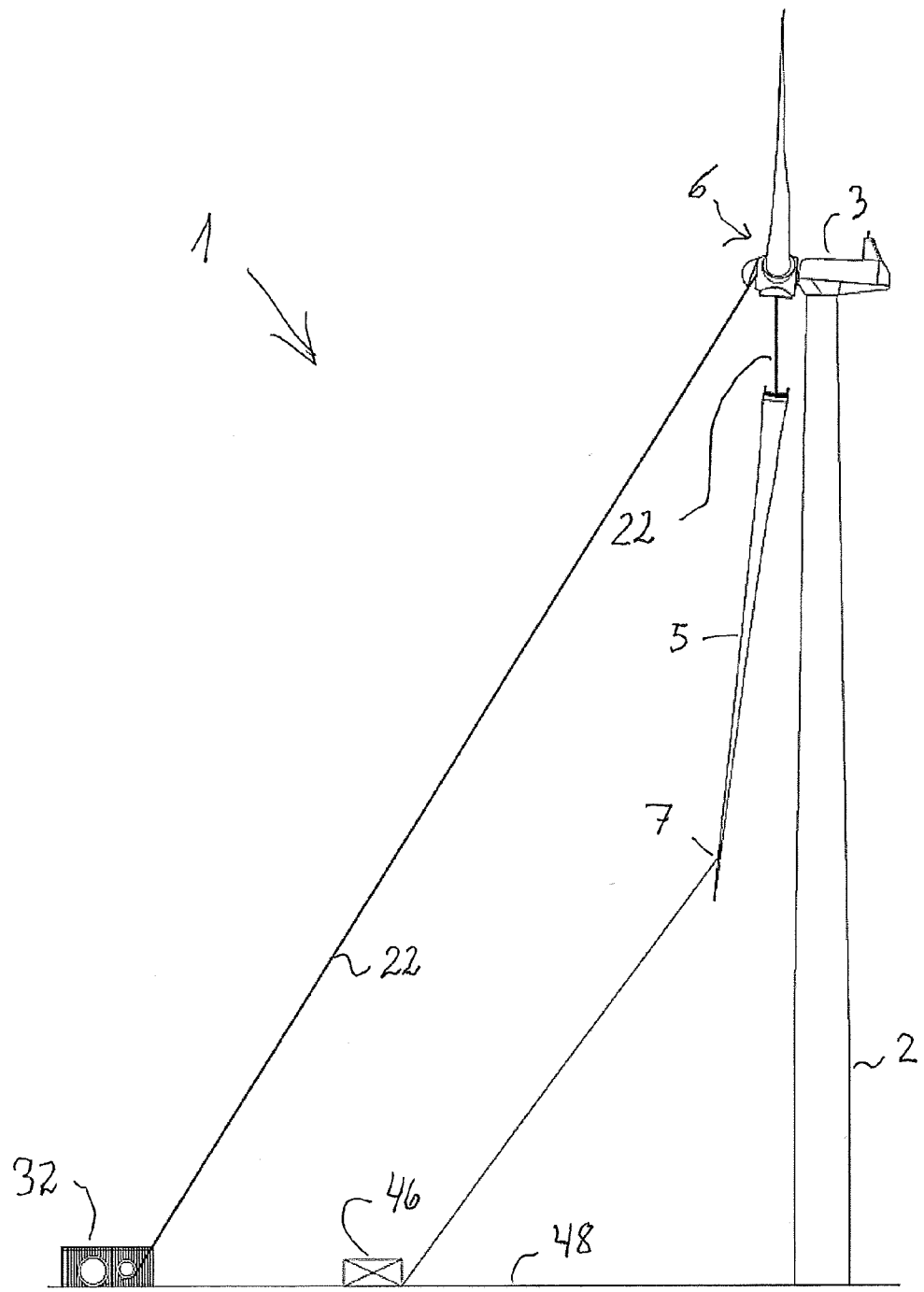

FIGS. 11 and 12 shows a wind turbine 1 having a tower 2 on which a nacelle 3 is attached. A hub 6 is connected to the nacelle to transfer rotational energy from blade 5 attached to the hub. A ground 48 based winch 32 has a wire 22 entering the hub for internal connection to the blade 5. The blade orientation is partly controlled by at least one tag line 44 attached to the blade in a vicinity of a blade tip 7. The tag line may be controlled by personnel or a winch 46. FIG. 12 shows how the blade 5 is lowered or lifted for either dismounting or mounting the blade.

The get the lifting wire 22 introduced into the hub a line or a rope lowered from the hub or nacelle and used to pull up the wire. The pulling can be done manually or using a small winch. Another option is to use a e.g. permanently installed service crane, which often is present in the nacelle of wind turbines.

To attach items like, securing means, a yoke, etc. to the bolt-like extensions 10, this may be done using the nuts 8, a through-going safety pin, a hook or a shackle, or other known attachment device which can be found in e.g. a hardware store.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intend for the invention to be practiced otherwise than as specifically described herein. Accordingly, this invention includes all modifications and equivalents of the subject matter recited or suggested herein as permitted by applicable law. Moreover, any combination of the above-described elements in all possible variations thereof is encompassed by the invention unless otherwise indicated herein or otherwise clearly contradicted by context.

The invention claimed is:

1. A method of dismounting a wind turbine blade from a wind turbine generator hub mounted to a nacelle placed on a tower, the hub being arranged for having a number of blades attached, where the blade to be dismounted comprises a plurality of fastening bolts extending from the blade or the blade bearing into the hub, the fastening bolts being arranged to engage and to fasten the blade to the hub, the method comprising:

placing the blade to be dismounted in a substantially vertical position such that a tip of the blade is facing downwards,
removing a number of fastening bolts,
mounting a number of bolt-like extensions in positions, where fastening bolts have been removed, the extensions being longer than the fastening bolts,
releasing the blade,
moving the blade to an intermediate blade position using the bolt-like extensions,
attaching a lifting yoke to a number of fastening bolts in the intermediate blade position, and
lowering the blade to a desired position using the lifting yoke.

2. The method according to claim 1, wherein the blade is lifted to or lowered from the hub with a wire connected to the lifting yoke, the wire being introduced into the hub via at least one pulley.

3. The method according to claim 1, wherein the wire is introduced into the hub via a receiving portion, the receiving portion being located in a concave part of the hub.

4. The method according to claim 1, wherein the wire is introduced into the hub via the nacelle or a hollow main shaft connecting the hub and the nacelle.

5. The method according to claim 1, wherein at least one anchoring frame is arranged for supporting at least one pulley is attached to fastening bolts arranged for fastening at least one blade other than the blade being mounted or dismounted.

6. The method according to claim 1, wherein the wire is operated by a ground based winch.

7. The method according to claim 1, wherein the lifting yoke is an essentially longitudinal frame having a receiver arranged at each end and adapted for receiving fastening bolts for securing a blade to the yoke as well as at least one attachment portion arranged to be engaged by a lifting device.

8. The method according to claim 1, wherein the blade is moved to or from the intermediate position by actuators connected to the boltlike extensions.

9. The method according to claim 8, wherein the actuators are hydraulically and hydraulic pressure is applied by a hydraulic unit comprising valves and a pump.

10. The method according to claim 1, wherein the blade is moved to or from the intermediate position with a second lifting yoke adapted to engage the bolt-like extensions.

11. The method according to claim 1, wherein at least two additional bolt-like extensions are mounted in positions adapted for receiving fastening bolts, wherein when the blade after being lowered to the intermediate position, the blade is secured using the two additional bolt-like extensions, and the lifting yoke, which is attached to the blade bolt-like extensions is detached and engaged with fastening bolts and the blade is lowered to a desired position using said lifting yoke.

12. The method according to claim 1, wherein a spinner structure is covering the hub to improve wind flow conditions around the hub, and where prior to introducing the wire into the hub a suitable section of the spinner is cut away in order to receive the wire.

13. The method according to claim 1, wherein the blade orientation is partly controlled by at least one tag line attached to the blade in a vicinity of the blade tip, the tag line being controlled by personnel or a winch.

14. The method according to claim 1, wherein the lifting wire is introduced into the hub by use of a line or a rope lowered from the hub or nacelle.

15. A method of mounting a wind turbine blade to a wind turbine generator hub mounted to a nacelle placed on a tower, the hub being adapted for having a number of blades attached, the method comprising:

arranging the blade hub to receive a blade to be mounted, the blade having a blade tip facing downwards and being in a substantially vertical position, attaching a plurality of fastening bolts extending from a root end of the blade or from a blade bearing at the blade root end, the fastening bolts being arranged for the blade fastened to the hub either directly or via a blade bearing, mounting a number of bolt-like extensions in positions adapted for receiving fastening bolts, the extensions being longer than the fastening bolts, attaching a lifting yoke to a number of fastening bolts, lifting the blade with the lifting yoke to an intermediate blade position at the blade hub, where the bolt-like extensions extend through mounting holes in the hub, the mounting holes being arranged for receiving the fastening bolts, holding the blade in the intermediate blade position using the bolt-like extensions, removing the lifting yoke, and using the bolt-like extensions for moving the blade from the intermediate blade position to a position, where the blade is fastened to the hub.

16. The method according to claim 15, wherein at least two additional boltlike extensions are mounted in positions adapted for receiving fastening bolts, wherein when the blade is in the intermediate position, the blade is secured using the two additional bolt-like extensions, and where the lifting yoke, which is attached to the fastening bolts is detached and engaged with bolt-like extensions for lifting the blade into a position, where the fastening bolts are fastened to the hub.

* * * * *